US006707515B1

United States Patent
Ide et al.

(10) Patent No.: US 6,707,515 B1
(45) Date of Patent: Mar. 16, 2004

(54) LIQUID CRYSTAL DISPLAY

(75) Inventors: Masafumi Ide, Tokorozawa (JP); Takashi Akiyama, Sayama (JP); Yasushi Kaneko, Sayama (JP); Naoyoshi Tohyama, Akishima (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/269,301

(22) PCT Filed: Jul. 30, 1998

(86) PCT No.: PCT/JP98/03408
§ 371 (c)(1),
(2), (4) Date: Mar. 29, 1999

(87) PCT Pub. No.: WO99/06877
PCT Pub. Date: Feb. 11, 1999

(30) Foreign Application Priority Data

Jul. 30, 1997 (JP) .............................. 9-204417

(51) Int. Cl.$^7$ ...................... G02F 1/1347; G02F 1/1335
(52) U.S. Cl. ........................... 349/74; 349/96
(58) Field of Search ............................. 349/74, 96, 73, 349/97

(56) References Cited

U.S. PATENT DOCUMENTS

| 3,840,695 A | * | 10/1974 | Fischer ........................ 349/106 |
| 4,684,939 A | * | 8/1987 | Streit ............................. 349/33 |
| 5,680,184 A | * | 10/1997 | Nishino ........................ 349/78 |
| 5,726,723 A | * | 3/1998 | Wang et al. ................... 349/75 |
| 6,124,971 A | * | 9/2000 | Ouderkirk et al. ........... 359/487 |
| 6,201,770 B1 | * | 3/2001 | Arikawa et al. .............. 349/97 |
| 6,262,842 B1 | * | 7/2001 | Ouderkirk et al. ............ 349/96 |
| 6,271,901 B1 | * | 8/2001 | Ide et al. ....................... 349/96 |

FOREIGN PATENT DOCUMENTS

| GB | 1 569 516 | | 6/1980 |
| JP | 54-153066 | | 12/1979 |
| JP | 6-230362 | | 8/1994 |
| WO | WO97/01788 | * | 1/1997 |
| WO | WO 97/01789 | | 1/1997 |
| WO | WO99/03017 | * | 1/1999 |

* cited by examiner

*Primary Examiner*—Dung Nguyen
(74) *Attorney, Agent, or Firm*—Westerman, Hattori, Daniels & Adrian, LLP

(57) ABSTRACT

The invention provides a liquid crystal display device having variety in design, comprising a first liquid crystal cell (16) and a second liquid crystal cell (18), made up of a liquid crystal layer sealed in a gap between a pair of transparent substrates having an electrode formed on each of the inner surfaces thereof, facing each other and disposed in that order from the visible side; an absorption-type polarizing film (12) disposed on the visible side of the first liquid crystal cell (16), for absorbing the light linearly polarized in the direction orthogonal to the transmission axis thereof; and a reflection-type polarizing film (14) disposed on a side of the second liquid crystal cell (18), opposite from the visible side thereof, for reflecting the light linearly polarized in the direction orthogonal to the transmission axis thereof.

44 Claims, 9 Drawing Sheets

LIQUID CRYSTAL DISPLAY

TECHNICAL FIELD

The invention relates to a liquid crystal display device for use as a display panel in various electronic equipment such as a timepiece (watch and clock), portable information equipment, and so forth.

BACKGROUND TECHNOLOGY

A timepiece for indicating digital display of time information such as the hour, minute, and second, and calendar information such as the date, days of the week, the month, and the year, by use of a liquid crystal display panel, has been in widespread use for wrist watches and clocks, provided with a crystal oscillation circuit There has also been in use a combination watch wherein an analog display indicating time information by the hands of the watch is used in combination with digital display indicating time information and calendar information in numbers and letters.

Further, there has been proposed an analog watch for selectively displaying markers in various patterns, or for displaying simulated hands for an hour hand, a minute hand, and a second hand, by providing the dial thereof based on a liquid crystal display panel (refer to, for example, Japanese Patent Laid-open S54-153066).

A reflective-type liquid crystal display device, small in size and consuming very little electric power, has been in widespread use as a display panel for displaying necessary information (character information and graphic information) in various electronic equipment other than a timepiece, such as cellular phones, desktop electronic computers, game players, and so forth.

As such a liquid crystal display device as described above, in a conventional liquid crystal display panel, a liquid crystal cell filled with liquid crystals is sandwiched between two transparent substrates having an electrode on respective inner surfaces thereof, facing each other, and an upper polarizing film and a lower polarizing film are disposed, respectively, on the external surface of the transparent substrates, on the opposite sides. If an electric field is applied to the liquid crystals by applying a voltage to a pair of electrodes on the transparent substrates holding the liquid crystal cell therebetween, the optical property of the liquid crystals is changed, thereby locally controlling transmission and absorption of light falling on the liquid crystal display panel such that a predetermined display is effected.

Either of the upper polarizing film or the lower polarizing film is a polarizing film absorbing the light linearly polarized in the direction orthogonal to the transmission axis thereof.

In the case of a watch using the conventional liquid crystal display panel described above, time information and calendar information are displayed in black against a white background in a normally white mode that is common.

However, by simply displaying time information and calendar information in black against the white background as described in the foregoing, neither variation in design nor interest can be offered, with a resulting tendency to lose soon popularity with consumers. Probably, as a result, consumption of digital watches has recently been on the decline, and neither combination watches nor analog watches with a liquid crystal display panel have since received market acceptance.

Similarly, with the conventional liquid crystal display panel used in electronic equipment other than a timepiece, various information expressed in characters and graphics is generally displayed in black against the white background, and although there are some wherein information can be displayed in white against the black background in an inverse mode, the conventional liquid crystal display panel has still been found lacking in design variation and aesthetic qualities.

In light of the present situation as described, the present invention has been developed, and an object of the invention is to provide a liquid crystal display device for use in various electronic equipment such as a timepiece (watch and clock), and so forth, capable of offering attractive variation in design and displaying information clearly so that a viewer can see the display with greater ease.

DISCLOSURE OF THE INVENTION

To this end, the invention provides a liquid crystal display device comprising a first liquid crystal cell and disposed on the visible side made up of a liquid crystal layer sealed in a gap between a pair of transparent substrates having an electrode formed on each of the inner surfaces thereof, facing each other; a second liquid crystal cell disposed on the backside of the first liquid crystal cell; an absorption-type polarizing film disposed on the visible side of the first liquid crystal cell, for absorbing the light linearly polarized in the direction orthogonal to the transmission axis thereof; and a reflection-type polarizing film disposed on a side of the second liquid crystal cell opposite from the visible side thereof, for reflecting the light linearly polarized in the direction orthogonal to the transmission axis thereof.

Further, a reflector or a color filter may be disposed on a side of the reflection-type polarizing film, opposite from the visible side thereof.

In the case of the color filter being disposed, any of a selective-transmission-type color filter, a selective-transmission-type color polarizing film, and a dielectric multi-layered filter may be used.

A light scattering film may be disposed on the visible side of the absorption-type polarizing film.

A light scattering film may be disposed on the visible side of the absorption-type polarizing film while a reflector or a color filter may be disposed on a side of the reflection-type polarizing film, opposite from the visible side thereof.

A color filter may be disposed on a side of the reflection-type polarizing film, opposite from the visible side thereof while a reflector may be disposed on a side of the color filter, opposite from the visible side thereof. Further, a light scattering film may be disposed on the visible side of the absorption-type polarizing film.

Alternatively a backlight may be disposed on a side of the reflection-type polarizing film, opposite from the visible side thereof. In such a case, any of an electroluminescence light, a light-emitting diode array, a hot cathode fluorescent lump, and a cold-cathode fluorescent lamp may be adopted for the backlight.

In this case, a transflective reflector or a color filter is preferably disposed between the reflection-type polarizing film and the backlight Even in this case, a light scattering film is preferably disposed on the visible side of the absorption-type polarizing film.

A color filter and a transflective reflector may be disposed between the reflection-type polarizing film and the backlight With any of the liquid crystal display devices described above, it is desirable that the absorption-type polarizing film and the reflection-type polarizing film are disposed such that respective transmission axes are orthogonal to or parallel with each other.

A liquid crystal layer of the first liquid crystal cell and the second liquid crystal cell, respectively, is preferably composed of liquid crystals causing linearly polarized light passing therethrough to undergo phase modulation or intensity modulation.

The liquid crystal layers of the first liquid crystal cell and the second liquid crystal cell, respectively, are preferably composed of any of twisted nematic liquid crystals, supertwisted nematic liquid crystals and guest-host liquid crystals.

In the case of the guest-host liquid crystals, use of guest-host liquid crystals having homogeneous alignment or homeotropic alignment, in an initial alignment thereof, is preferable.

Alternatively the liquid crystal layers of the first liquid crystal cell and the second liquid crystal cell, respectively, may be composed of ferroelectric liquid crystals or anti-ferroelectric liquid crystals.

In the case where the liquid crystal layer of the first liquid crystal cell is composed of twisted nematic liquid crystals, or guest-host liquid crystals having homogeneous alignment or homeotropic alignment, in an initial alignment thereof, the transmission axis of the absorption-type polarizing film is preferably oriented in a direction orthogonal to or parallel with the long axes of liquid crystal molecules in the liquid crystal layer of the first liquid crystal cell, on the visible side thereof.

In the case where the liquid crystal layers of the first liquid crystal cell and the second liquid crystal cell, respectively, are composed of twisted nematic liquid crystals, it is desirable that the transmission axis of the absorption-type polarizing film is oriented in a direction orthogonal to or parallel with the long axes of liquid crystal molecules in the liquid crystal layer of the first liquid crystal cell, on the visible side thereof, the long axes of liquid crystal molecules in the liquid crystal layer of the first liquid crystal cell, on a side thereof, opposite from the visible side, are oriented in a direction parallel with or orthogonal to the long axes of liquid crystal molecules in the liquid crystal layer of the second liquid crystal cell, on the visible side thereof, and the long axes of liquid crystal molecules in the liquid crystal layer of the second liquid crystal cell, on a side thereof, opposite from the visible side, are oriented in a direction parallel with or orthogonal to the transmission axis of the reflection-type polarizing film.

If whole-surface electrodes are adopted for both the electrodes formed on the inner surfaces of the pair of the transparent substrates of the first liquid crystal cell, facing each other, the function of an optical shutter for display in a metallic tone can be provided.

With the liquid crystal display device according to the invention, having the construction described above, information expressed in characters, graphics, and so forth can be displayed in a transparent state, in a black color, or in an optional color against a background in a metallic tone, or conversely, display of the information such as characters, graphics, and so forth, in a metallic tone, can be effected in a high contrast against the background displayed in a transparent state, in a black color, or in an optional color. Further, transmission-type display can also be effected at night, and so forth by installing a backlight.

BEST MODE FOR CARRYING OUT THE INVENTION

Preferred embodiments of a liquid crystal display device according to the invention will be described hereinafter with reference to the attached drawings.

Figure 1:
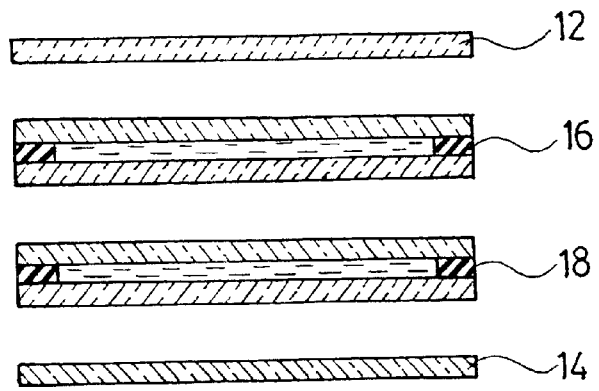
FIG. 1 is a schematic sectional view showing the construction of a first embodiment of a liquid crystal display device according to the invention.
Figure 2:
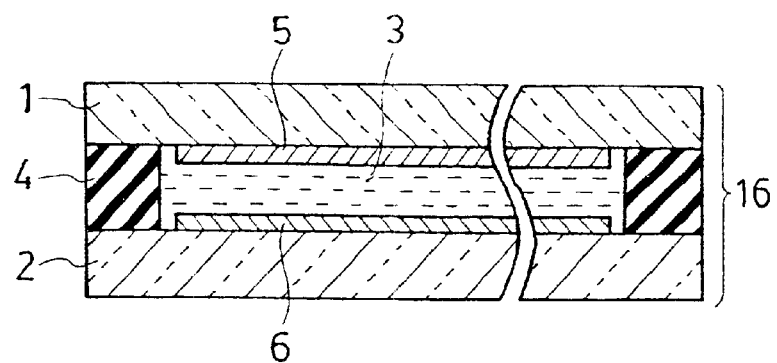
FIGS. 2 and 3 are enlarged sectional views of a first liquid crystal cell 16, and a second liquid crystal cell 18, respectively, shown in FIG. 1, showing foreshortened schematic illustration.
Figure 3:
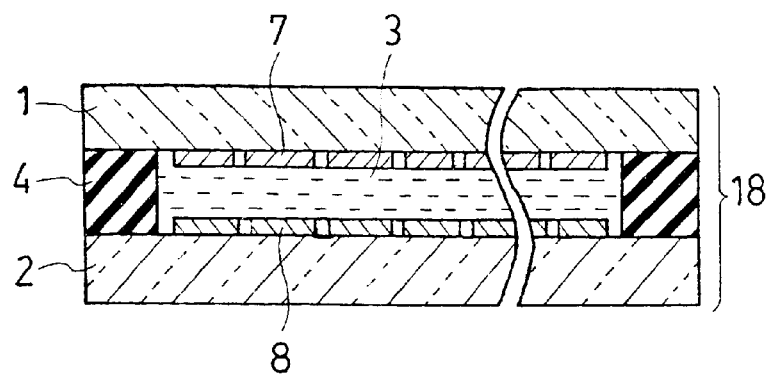

First Embodiment: FIGS. 1 to 3

First, a first embodiment of a liquid crystal display device according to the invention is described with reference to FIGS. 1 to 3.

As shown in FIG. 1, with the liquid crystal display device, a first liquid crystal cell 16 and a second liquid crystal cell 18 are disposed such that display regions of the respective liquid crystal cells are superimposed on each other, and an absorption-type polarizing film 12 is disposed on the visible side of the first liquid crystal cell 16, which is disposed on the visible side (the upper side in the figure of the cell) of the cell. Further, a reflection-type polarizing film 14 is disposed on a side of the second liquid crystal cell 18 opposite from the visible side.

The absorption-type polarizing film 12 disposed on the visible side of the first liquid crystal cell 16 is a sheet-shaped member capable of transmitting the light linearly polarized in the direction parallel with the transmission axis thereof, and absorbing the light linearly polarized in the direction orthogonal to the transmission axis thereof.

The reflection-type polarizing film 14 disposed on a side of the second liquid crystal cell 18 opposite from the visible side, is a sheet-shaped member capable of reflecting the light linearly polarized in the direction orthogonal to the transmission axis thereof, and transmitting the light linearly polarized in the direction parallel with the transmission axis thereof.

An optical film, DBEF (trade name), marketed by Sumitomo Three M Co., Ltd. is used for the reflection-type polarizing film 14.

As shown in an enlarged sectional view in FIGS. 2 and 3, respectively, the first liquid crystal cell 16 and the second liquid crystal cell 18 are made up of two transparent glass substrates 1, 2 stuck together with a sealing member 4 provided on the periphery thereof in such a way as to seal a liquid crystal layer 3 within a gap formed between the two glass substrates. In this embodiment, twisted nematic liquid crystals are used in the liquid crystal layer 3.

Transparent electrodes 5, 6, or 7, 8, made of indium tin oxide (ITO), are formed on the inner faces of the sides in contact with the liquid crystal layer 3, and the two glass substrates, 1, 2, respectively, and an alignment treatment is applied to the surface of the respective transparent electrodes such that liquid crystal molecules are aligned in a predetermined direction.

An alignment condition of liquid crystals held between the transparent electrodes 5, 6, and 7, 8, is altered by applying a voltage between the transparent electrodes 5, 6, and 7, 8, thereby displaying various information such as time information and calendar information.

The first liquid crystal cell 16 and the absorption-type polarizing film 12 are disposed such that the direction of the long axes of liquid crystal molecules located on the visible side of the first liquid crystal cell 16 is parallel with the transmission axis of the absorption-type polarizing film 12.

Also, the first liquid crystal cell 16 and the second liquid crystal cell 18 are disposed such that the direction of the long axes of liquid crystal molecules located on a side opposite from the visible side of the first liquid crystal cell 16 is parallel with the dicon of the long axes of liquid crystal molecules located on the visible side of the second liquid crystal cell 18.

Further, the second liquid crystal cell 18 and the reflection-type polarizing film 14 are disposed such that the direction of the long axes of liquid crystal molecules located on a side opposite from the visible side of the second liquid crystal cell 18 is orthgonal to the direction of the transmission axis of the reflection-type polarizing film 14.

The first liquid crystal cell 16 and the second liquid crystal cell 18 are each set to have a twist angle of 90°.

The absorption-type polarizing film 12 disposed on the visible side of the first liquid crystal cell 16, and the reflection-type polarizing film 14 disposed on the side of the second liquid crystal cell 18, opposite from the visible side, are disposed such that the directions of the transmission axis of the former intersects the transmission axes are orthogonal to each other.

With the liquid crystal display panel according to this embodiment of the invention, half of light falling on the absorption-type polarizing film 12 from the visible side is absorbed by the absorption-type polarizing film 12, and the other half thereof is transmitted therethrough as the light linearly polarized in the direction parallel with the transmission axis of the absorption-type polarizing film 12, falling on the first liquid crystal cell 16 so that the direction of the linearly polarizing light is rotated by a predetermined twist angle (90° in this case) due to the light guide effect when the first liquid crystal cell 16 and the second liquid crystal cell 18 are in the "off" state wherein no voltage is applied between the electrodes.

Subsequently, the linearly polarized light falling on the second liquid crystal cell 18 has its polarized direction rotated by the twist angle due to the light guide effect.

As the direction of the long axes of liquid crystal molecules located on the side opposite from the visible side of the second liquid crystal cell 18, is orthogonal to the transmission axis of the reflection-type polarizing film 14, disposed on the side of the second liquid crystal cell 18 opposite from the visible side, light outgoing from the second liquid crystal cell 18 undergoes specular reflection by the reflection-type polarizing film 14.

The light reflected propagates through the second liquid crystal cell 18 and the first liquid crystal cell 16, in this order, being turned to be linearly polarized in the direction parallel with the transmission axis of the absorption-type polarizing film 12, disposed on the visible side of the first liquid crystal cell 16, due to the light guide effect, so that the light in whole is transmitted through the absorption-type polarizing film 12, and travels out to the visible side. Accordingly, viewers can see the light in a metallic tone, reflected by the reflection-type polarizing film 14.

Next, when a voltage is applied between the electrodes 5, 6 of the first liquid crystal cell 16 so as to cause liquid crystal molecules to undergo homeotropic alignment, the first liquid crystal cell 16 loses its light guide effect. Accordingly, a component of incoming light having the direction of the transmission axis of the absorption-type polarizing film 12 falls on the second liquid crystal cell 18 without the direction thereof being rotated.

This state is thus equivalent to the second liquid crystal cell 18 being sandwiched between a pair of orthogonally polarizing elements, consisting of the absorption-type polarizing film 12 and the reflection-type polarizing film 14.

Now, if the electrodes 5, 6 of the first liquid crystal cell 16 are formed so as to function as electrodes across the whole surface area thereof while the electrodes 7, 8 of the second liquid crystal cell 18 are formed in a predetermined pattern for displaying characters and graphics, or in a dot matrix pattern in a pattern of strips for rows or lines of the dot matrix, the second liquid crystal cell 18 loses its light guide effect in regions thereof in the "on," state wherein a voltage is applied between the electrodes 7, 8 of the second liquid crystal cell 18, and the light linearly polarized in the direction parallel with the transmission axis of the absorption-type polarizing film 12 is transmitted in whole therethrough, thereby being turned to be linearly polarized in the direction orthogonal to the transmission axis of the reflection-type polarizing film 14, and undergoing specular reflection by the reflection-type polarizing film 14. Accordingly, viewers can see the reflected light in a metallic tone.

In regions of the second liquid crystal cell 18, in the "off" state wherein no voltage is applied between the electrodes 7, 8 thereof, the light linearly polarized in the direction parallel with the transmission axis of the absorption-type polarizing film 12, incident on the second liquid crystal cell 18, is rotated by 90°, and turned to be linearly polarized in the direction parallel with the transmission axis of the reflection-type polarizing film 14, thereby being transmitted in whole through the reflection-type polarizing film 14. The liquid crystal display device is thus turned to be in a transparent state showing therethrough a color of the background. Accordingly, if a light absorption member or a colored member is disposed underneath the reflection-type polarizing film 14, a view in a black color or the color of the colored member can be seen.

Thus, in the liquid crystal display device according to the first embodiment of the invention, the whole surface is displayed in a metallic tone when both the first liquid crystal cell 16 and the second liquid crystal cell 18 are in the "off" state, and when the first liquid crystal cell 16 is in the "on" state wherein a voltage is applied between the electrodes (whole surface electrodes) 5, 6 thereof, display will be effected in a transparent condition, An optical shutter for displaying a metallic tone can thus be opened or closed either by applying or by not applying a voltage to the first liquid crystal cell 16.

Further, with a voltage applied between the electrodes 5, 6 of the first liquid crystal cell 16, and by applying a voltage between the electrodes 7, 8 of the second liquid crystal cell 18, only required display regions will be in a display state in a metallic tone, enabling display of information in a metallic tone.

Accordingly, in contrast to a liquid crystal display device wherein digital display of information such as time information, calendar information, and so forth is effected in a black color against a white background, the liquid crystal display device according to this embodiment is capable of effecting display not only striking in contrast but also highly variable in design and amusing to users.

Consequently, with the use of this liquid crystal display device, electronic equipment such as an electronic timepiece, and so forth, highly variable in design, can be provided.

Additionally, the absorption-type polarizing film 12 and the reflection-type polarizing film 14, disposed above and below, with the first liquid crystal cell 16 and the second liquid crystal cell 18 interposed therebetween, may be disposed such that the transmission axis of the absorption-type polarizing film 12 runs in parallel with the transmission axis of the reflection-type polarizing film 14.

With such a configuration, contrary to the case previously described as above, when the first liquid crystal cell 16 and the second liquid crystal cell 18 are in the "off" state, the light linearly polarized in the direction parallel with the transmission axis of the absorption-type polarizing film 12 is rotated by 90° by each of the first liquid crystal cell 16 and the second liquid crystal cell 18, respectively, due to the light guide effect thereof, so that same is rotated by 180° altogether, and turned to be linearly polarized in the direction parallel with the transmission axis of the reflection-type polarizing film 14, thus transmitting therethrough in whole. Accordingly, the interior of the liquid crystal display device will be in a transparent condition.

When a voltage is applied only between the whole-surface electrodes 5, 6 of the first liquid crystal cell 16, display in a metallic tone, dependent on the reflection characteristic of the reflection-type polarizing film 14, is effected.

Further, when a voltage is applied only between the electrodes 7, 8 of the second liquid crystal cell 18, being patterned as required for displaying characters and time, while keeping the first liquid crystal cell 16 in the "on" state, display of characters and time can be effected within the display in a metallic tone, dependent on the reflection characteristic of the reflection-type polarizing film 14.

Conversely, the electrodes 5, 6 of the first liquid crystal cell 16 may be formed in predetermined patterns for characters and graphics while the electrodes 7, 8 of the second liquid crystal cell 18 may be formed into whole-surface electrodes.

In this case, it is so arranged that the transmission axis of the absorption-type polarizing film 12 disposed on the visible side will be in parallel with the direction of the long axes of liquid crystal molecules located on the visible side of the first liquid crystal cell 16.

Further, guest-host liquid crystals, other than the twisted nematic liquid crystals, may be used in the liquid crystal layer 3 of either of or both the first liquid crystal cell 16 and the second liquid crystal cell 18.

The guest-host liquid crystal is a mixed type liquid crystal produced by dissolving a dichroic dye as solute in a liquid crystal compound as solvent If the alignment condition of the guest-host liquid crystal molecules is caused to change by applying an electric field thereto, alignment of the dichroic dye can be controlled following movement of the guest-host liquid crystal molecules, thereby indicating color display after modulating absorption of light incoming from a given direction.

Also, for the liquid crystal layer 3 described, supertwisted nematic liquid crystals, ferroelectric liquid crystals, or anti-ferroelectric liquid crystals may be used.

Figure 4:
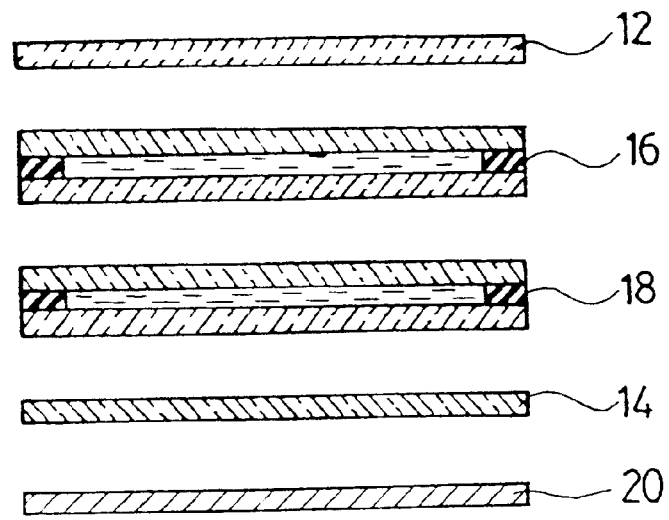
FIGS. 4 to 18 are schematic sectional views for illustrating the construction of second to sixteenth embodiments, respectively, of a liquid crystal display device according to the invention.

Second Embodiment: FIG. 4

Next, a second embodiment of a liquid crystal display device according to the invention is described with reference to FIG. 4.

In FIG. 4, parts corresponding to those previously described with reference to FIG. 1 are denoted by the same reference numerals.

A first liquid crystal cell 16 and a second liquid crystal cell 18 have the same construction as that of corresponding parts of the first embodiment shown in FIG. 2 and FIG. 3, respectively. The same applies to other embodiments described hereinafter with reference to FIGS. 5 to 18.

The liquid crystal display device shown in FIG. 4 differs from the first embodiment of the invention only in that a reflector 20 is installed on a side opposite from the visible side (the underside in the figure) of the reflection-type polarizing film 14 disposed on the side of the second liquid crystal cell 18 opposite from the visible side.

The reflector 20 is a film-like substrate with a thin film of a metal, such as aluminum or nickel, formed thereon.

With the liquid crystal display device according to this embodiment, comprising the reflector 20 disposed on the underside of the reflection-type polarizing film 14, linearly polarized light passing through the reflection-type polarizing film 14 is reflected by the reflector 20, and travels out towards the visible side along an optical path in reverse.

Accordingly, when a predetermined difference is set between the reflection characteristic of the reflection-type polarizing film 14 and that of the reflector 20, switching between the reflection characteristics can be effected by applying or by not applying a voltage to the first liquid crystal cell 16.

Now, if electrodes of the second liquid crystal cell 18 are formed in a predetermined pattern for displaying characters and time, since a region of the second liquid crystal cell 18 where a voltage is applied will lose its light guide effect, the light linearly polarized in the direction parallel with the transmission axis of the absorption-type polarizing film 12, falling on the region, is transmitted therethrough as it is, and falls on the reflection-type polarizing film 14 being linearly polarized in the direction orthogonal to the transmission axis of the reflection-type polarizing film 14. Consequently, the light incident thereon is reflected in whole by the reflection-type polarizing film 14, and travels out towards the visible side, so that a viewer can see reflected light in a metallic tone, dependent on the reflection characteristic of the reflection-type polarizing film 14.

Thus, in the liquid crystal display device according to this embodiment, when a voltage is applied to neither the first liquid crystal cell 16 nor the second liquid crystal cell 18, the entire surface is displayed in a metallic tone, dependent on the reflection characteristic of the reflection-type polarizing film 14. On the other hand, when a voltage is applied to whole surface electrodes of the first liquid crystal cell 16, display will be dependent on the reflection characteristic of the reflector 20, so that an optical shutter in a metallic tone can be opened or closed by applying or by not applying a voltage to the first liquid crystal cell 16.

Further, by applying a voltage to the electrodes of the second liquid crystal cell 18, formed in the predetermined pattern, while applying a voltage to the whole surface electrodes of the first liquid crystal cell 16, regions in the predetermined pattern only can be displayed in a metallic tone dependent on the reflection characteristic of the reflection-type polarizing film 14.

Accordingly, in comparison with a conventional liquid crystal display device for displaying various information in a black color against a white background, the liquid crystal display device according to this embodiment is capable of effecting contrast by changeover of the reflection characteristic between the reflection-type polarizing film 14 and the reflector 20, thus enabling the construction thereof to have variety in design so as to be able to offer users a sense of amusement.

Therefore, if the liquid crystal display device according to this embodiment is applied to a timepiece (mainly a watch), the timepiece capable of indicating digital display having variation in design can be provided.

Further, this embodiment has a configuration wherein the reflector 20 is installed on the underside of the reflection-type polarizing film 14 disposed on the side of the second liquid crystal cell 18 opposite from the visible side.

When the reflector 20 is disposed on the underside of the reflection-type polarizing film 14 in this way, light transmitted through the reflection-type polarizing film 14 can be reflected repeatedly between the reflector 20 and the backside surface of the reflection-type polarizing film 14, even if the reflector 20 is of a depolarization type, resulting in improvement in a light utilization efficiency. As a result, a bright display high in contrast can be effected.

Here, the absorption-type polarizing film 12 and the reflection-type polarizing film 14, disposed above and below, with the first liquid crystal cell 16 and the second liquid crystal cell 18 interposed therebetween, may be disposed such that the transmission axis of the absorption-type polarizing film 12 is parallel with that of the reflection-type polarizing film 14.

With such a configuration, contrary to the case described above, when a voltage is not applied to the first liquid crystal cell 16 and the second liquid crystal cell 18, display dependent on the reflection characteristic of the reflector 20 will be effected while display dependent on the reflection characteristic of the reflection-type polarizing film 14 will be effected in metallic tone when a voltage is applied to the whole surface electrodes of the first liquid crystal cell 16 only.

Further, when a voltage is applied between the electrodes of the second liquid crystal cell 18, formed in a predetermined pattern for displaying characters and graphics while keeping the first liquid crystal cell 16 in a state wherein a voltage is applied thereto, display of characters and graphics, dependent on the reflection characteristic of the reflector 20, can be effected within the display in a metallic tone, dependent on the reflection characteristic of the reflection-type polarizing film 14.

Needless to say, in this case as well, electrodes may be formed in a predetermined pattern for displaying characters and graphics inside the first liquid crystal cell 16, and whole surface electrodes may be formed inside the second liquid crystal cell 18.

In such a case, it is to be arranged such that the transmission axis of the absorption-type polarizing film 12 disposed on the visible side will be in parallel with the direction of the long axes of liquid crystal molecules located on the visible side of the first liquid crystal cell 16.

Similarly to the case of the first embodiment, various other modifications to this embodiment are possible.

Figure 5:
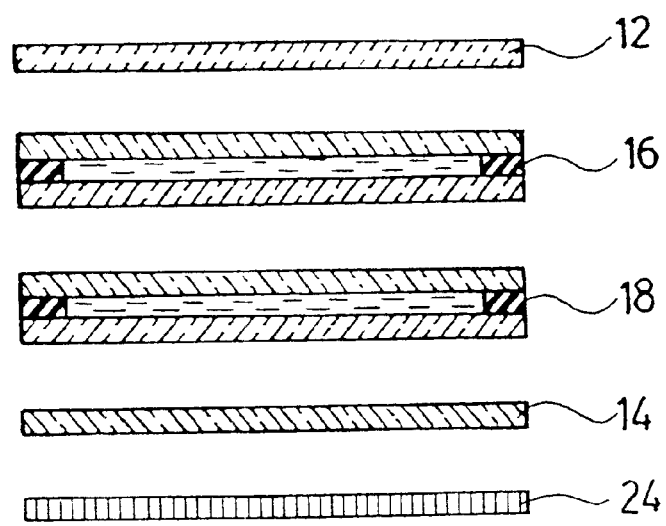

Third Embodiment: FIG. 5

Next, a third embodiment of a liquid crystal display device according to the invention is described with reference to FIG. 5.

The liquid crystal display device shown in FIG. 5 differs from the first embodiment of the invention, shown in FIG. 1, only in that a color filter 24 is installed on a side opposite from the visible side (the underside in the figure) of a reflection-type polarizing film 14 disposed on a side of the second liquid crystal cell 18 opposite from the visible side.

For the color filter 24, a selective-transmission-type color polarizing film, a dielectric multi-layered filter, a selective-transmission-type color filter, or the like is used.

The selective-transmission-type color polarizing film has property of transmitting all the light, at all wavelengths, linearly polarized in the direction parallel with the transmission axis thereof, but transmitting a light component at a specific wavelength (a light component in a specific color) only, of the light linearly polarized in the direction orthogonal to the transmission axis thereof, while absorbing light components at other wavelengths.

The dielectric multi-layered filter is formed by laminating a plurality of dielectrics having different refractive indexes to each other, and has property of reflecting a light component at a specific wavelength, but transmitting light components at other wavelengths.

The selective-transmission-type color filter is the most common color filter for transmitting a light component at a specific wavelength only, but absorbing light components at all the other wavelengths. For example, a pigment dispersed coating, prepared by mixing and dispersing a pigment in a specific color into an organic resin, and the like is used for the selective-transmission-type color filter.

In the liquid crystal display device according to this embodiment, comprising the color filter 24 disposed on the underside of the reflection-type polarizing film 14, linearly polarized light transmitted through the reflection-type polarizing film 14 is reflected according to the reflective characteristic of the color filter 24, dependent on the optical property thereof.

In this case, if the color filter 24 of a reflection-type is used, display is effected in the color of reflected light, dependent on the reflection spectrum of the color filter 24, and if the color filter 24 of an absorption-type is used, display can be effected in a muted color tone. Accordingly, change between the reflection characteristic of the reflection-type polarizing film 14, and the reflection characteristic or the absorption characteristic of the color filter 24 can be executed by applying or by not applying a voltage to the first liquid crystal cell 16.

Now, if electrodes of the second liquid crystal cell 18 are formed in a predetermined pattern for displaying characters and graphics, since a region of the second liquid crystal cell 18, wherein a voltage is applied, will lose its light guide effect, the incoming light linearly polarized in the direction parallel with the transmission axis of an absorption-type polarizing film 12 falling on the region is transmitted therethrough as it is, and falls on the reflection-type polarizing film 14 being linearly polarized in the direction orthogonal to the transmission axis of the reflection-type polarizing film 14. Consequently, the light incident thereon is reflected in whole by the reflection-type polarizing film 14, so that a viewer can see reflected light in a metallic tone, dependent on the reflection characteristic of the reflection-type polarizing film 14.

Thus, in the liquid crystal display device according to this embodiment, when a voltage is applied to neither the first liquid crystal cell 16 nor to the second liquid crystal cell 18, the entire surface is displayed in a metallic tone, dependent on the reflection characteristic of the reflection-type polarizing film 14. On the other hand, when a voltage is applied to whole surface electrodes of the first liquid crystal cell 16, display dependent on the reflection characteristic and the absorption characteristic of the color filter 24 will be effected, so that an optical shutter for a metallic tone can be opened or closed by applying or by not applying a voltage to the first liquid crystal cell 16.

Further, by applying a voltage to the electrodes of the second liquid crystal cell 18, formed in the predetermined pattern, while applying a voltage to the whole surface electrodes of the first liquid crystal cell 16, regions of the electrodes formed in the predetermined pattern only can be displayed in a metallic tone, dependent on the reflection characteristic of the reflection-type polarizing film 14, against a background color dependent on the reflection characteristic and the absorption characteristic of the color filter 24.

Accordingly, in comparison with a conventional liquid crystal display device for displaying various information in a black color, determined according to absorption characteristics of an absorption-type polarizing film, against a white background, the liquid crystal display device according to this embodiment is capable of producing contrast by varying the reflection characteristic and the absorption characteristic between that of the reflection-type polarizing film 14 and the color filter 24, thus enabling a configuration thereof to have variety in design so as to be able to offer users a sense of amusement Further, this embodiment has adopted the configuration wherein the color filter 24 is installed on the underside of the reflection-type polarizing film 14 disposed on the side of the second liquid crystal cell 18, opposite from the visible side.

If the color filter 24 is disposed on the underside of the reflection-type polarizing film 14 in this way, light transmitted through the reflection-type polarizing film 14 can be reflected repeatedly between the color filter 24 and the backside surface of the reflection-type polarizing film 14 even if the color filter 24 is of a depolarization type, resulting in improvement in a light utilization effisiency. As a result, a bright display in high contrast can be effected.

By disposing the color filter 24 on the underside of the reflection-type polarizing film 14 as described above, components of the light transmitted through the reflection-type polarizing film 14, at specific wavelengths, can be reflected or absorbed by the color filter 24. Accordingly, when the liquid crystal display device according to this embodiment is applied to a timepiece, regions for digitally displaying time information such as the hour, minute, and second, and calendar information such as day, days of the week, month, year or a background, or regions for analog display of simulated hands for an hour hand, a minute hand, and a second hand or a background, can be colored.

Here, the absorption-type polarizing film 12 and the reflection-type polarizing film 14, disposed above and below, with the first liquid crystal cell 16 and the second liquid crystal cell 18 interposed therebetween, may be disposed such that the transmission axis of the absorption-type polarizing film 12 is parallel with that of the reflection-type polarizing film 14.

With such a configuration, contrary to the case described above, when a voltage is not applied to the first liquid crystal cell 16 and the second liquid crystal cell 18, display dependent on the reflection and absorption characteristics of the color filer 24 will be effected while display in a metallic tone, dependent on the reflection characteristic of the reflection-type polarizing film 14, will be effected when a voltage is applied to the whole surface electrodes of the first liquid crystal cell 16 only.

Further, when a voltage is applied between the electrodes of the second liquid crystal cell 18, formed in a predetermined pattern for displaying characters and graphics, while keeping the first liquid crystal cell 16 in a state wherein a voltage is applied thereto, display of characters and graphics, in a color tone dependent on the reflection and absorption characteristics of the color filer 24, can be effected within the display in a metallic tone, dependent on the reflection characteristic of the reflection-type polarizing film 14.

Needless to say, in this case as well, electrodes may be formed in a predetermined pattern for displaying characters and graphics inside the first liquid crystal cell 16, and the whole surface electrodes may be formed inside the second liquid crystal cell 18.

In such a case, it is to be arranged such that the transmission axis of the absorption-type polarizing film 12 disposed on the visible side will be in parallel with the direction of the long axes of liquid crystal molecules located on the visible side of the first liquid crystal cell 16.

Similarly to the case of the first embodiment, various other modifications to this embodiment are also possible.

Figure 6:
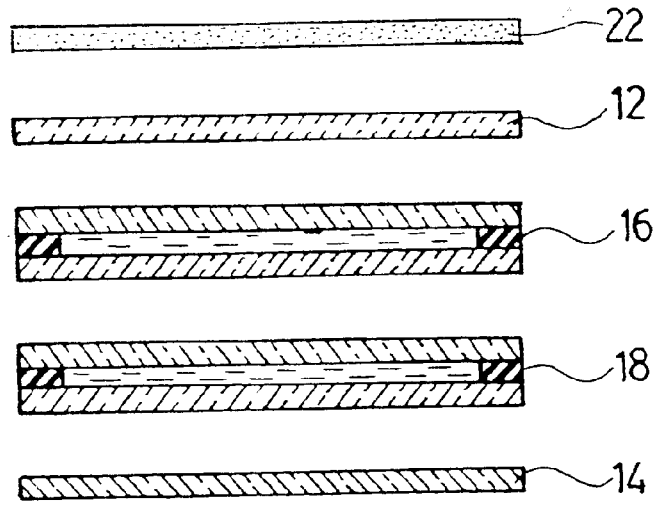

Fourth Embodiment FIG. 6

Next, a fourth embodiment of a liquid crystal display device according to the invention is described with reference to FIG. 6.

The liquid crystal display device shown in FIG. 6 differs from the first embodiment of the invention, shown in FIG. 1, only in that a light scattering film 22 is installed on the visible side of an absorption-type polarizing film 12 disposed on the visible side of a first liquid crystal cell 16.

The light scattering film 22 is formed by applying, for example, silica (silicon dioxide) particles, acrylic beads, calcium powders or the like, mixed into an adhesive, to a film-like substrate.

By installing the light scattering film 22 on the visible side of the absorption-type polarizing film 12 disposed on the visible side of the first liquid crystal cell 16, light failing on or outgoing from the liquid crystal display device is caused to undergo forward scattering or backward scattering as seen from the visible side due to the effect of the light scattering film.

A viewer sees reflected light in a metallic tone, reflected by a reflection-type polarizing film 14, through the light scattering film 22. Accordingly, a degree of the metallic tone undergoes a change owing to the characteristic of the light scattering film 22, and if, for example, the light scattering film 22 having a significant backward scattering characteristic as seen from the visible side is used, the metallic tone will be converted into a white color.

Thus, white display can be effected by scattering of light due to the effect of the light scattering film 22, enabling display of a background for displaying various information in a metallic tone to be changed into display in a softer color tone. Accordingly, with the use of the liquid crystal display device according to this embodiment, electronic equipment such as a timepiece, and so forth, capable of indicating elegant display, can be provided Similarly to the case of the first embodiment, various other modifications to this embodiment are also possible.

Figure 7:
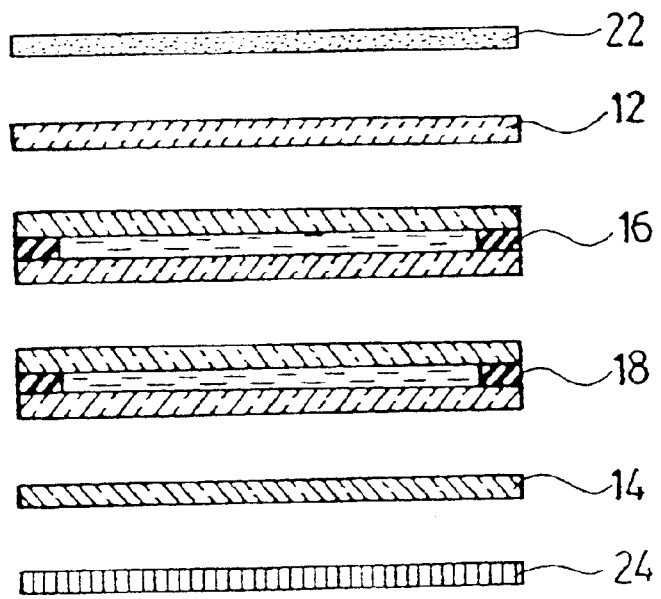

Fifth Embodiment: FIG. 7

Next, a fifth embodiment of a liquid crystal display device according to the invention is described with reference to FIG. 7.

The liquid crystal display device shown in FIG. 7 differs from the fourth embodiment of the invention, shown in FIG. 6, only in that a color filter 24 is installed on a side opposite from the visible side (the underside in the figure) of a reflection-type polarizing film 14 disposed on a side of the second liquid crystal cell 18 opposite from the visible side.

As in the case of the third embodiment shown in FIG. 5, a selective-transmission-type color polarizing film, a dielectric multi-layered filter, a selective-transmission-type color filter or the like is used for the color filter 24.

Since the operation and function of the liquid crystal display device according to this embodiment are equivalent to those of the liquid crystal display device equipped with the color filter 24 according to the third embodiment, shown in FIG. 5, in combination with the liquid crystal display device equipped with the light scattering film 22 according to fourth embodiment, shown in FIG. 6, description thereof is omitted here.

Similarly to the case of the first embodiment, various other modifications to this embodiment are also possible.

Figure 8:
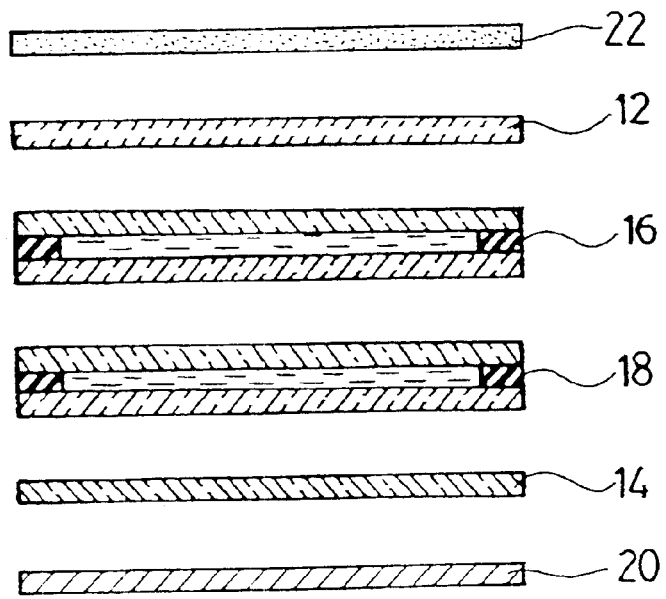

Sixth Embodiment: FIGS. 8

Next, a sixth embodiment of a liquid crystal display device according to the invention is described with reference to FIG. 8.

The liquid crystal display device shown in FIG. 8 differs from the fifth embodiment of the invention, shown in FIG. 7, only in that a reflector 20 in place of the color filter 24 is installed on a side opposite from the visible side (the underside in the figure) of the reflection-type polarizing film 14, opposite from the visible side thereof.

The reflector 20 is a film-like substrate with a thin film of a metal such as aluminum or nickel, formed thereon by means of vapor deposition, and so forth.

The light scattering film 22 installed on the visible side of an absorption-type polarizing film 12 is formed by applying silica (silicon dioxide) particles, acrylic beads, calcium powders or the like, mixed into an adhesive, to the surface of a film-like substrate. This is the same as in the case of the light scattering film 22 installed in the liquid crystal display device according to the fourth and fifth embodiments shown in FIGS. 6 and 7, respectively.

Since the operation and function of the liquid crystal display device according to this embodiment are equivalent to those of the liquid crystal display device equipped with the reflector 20 according to the second embodiment, shown in FIG. 4, in combination with the liquid crystal display device equipped with the light scattering film 22 according to fourth embodiment, shown in FIG. 6, description thereof is omitted here.

Similarly to the case of the first embodiment, various other modifications to this embodiment are also possible.

Figure 9:
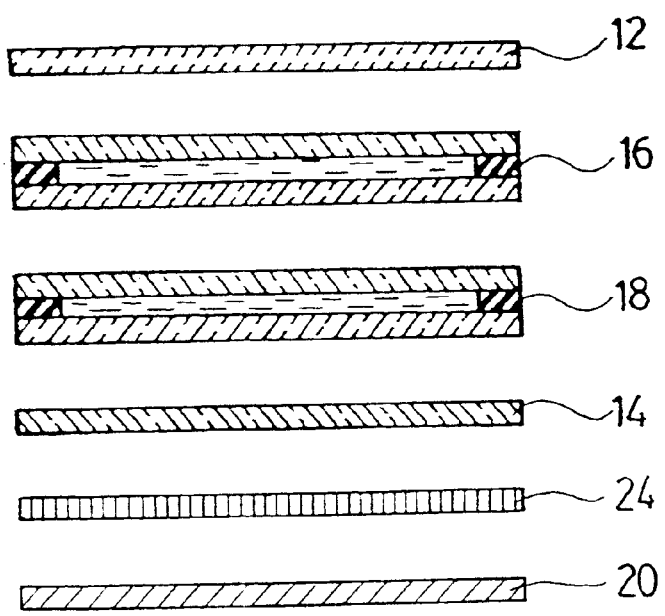

Seventh Embodiment: FIG. 9

Next, a seventh embodiment of a liquid crystal display device according to the invention is described with reference to FIG. 9.

The liquid crystal display device shown in FIG. 9 differs from the third embodiment of the invention, shown in FIG. 5, only in that a reflector 20 is installed on a side opposite from the visible side (the underside in the figure) of the color filter 24 disposed on the side (the underside in the figure) of the reflection-type polarizing film 14, opposite from the visible side.

The color filter 24 is the same as that described in the third embodiment, shown in FIG. 5, and the reflector 20 is the same as that described in the second embodiment, shown in FIG. 4.

Thus, with the liquid crystal display device according to this embodiment, the color filter 24 is disposed on the underside of the reflection-type polarizing film 14, and the reflector 20 is disposed further on the underside of the color filter 24.

Consequently, linearly polarized light transmitted through the reflection-type polarizing film 14 is reflected according to the reflection characteristic dependent on optical properties of the color filter 24 and the reflector 20. Accordingly, change between the reflection characteristic of the reflection-type polarizing film 14 and the absorption and reflection characteristics of the color filter 24 and the reflector 20 can be effected by applying or by not applying a voltage to a first liquid crystal cell 16.

Now, if a voltage is applied to electrodes of the second liquid crystal cell 18, formed in a predetermined pattern for displaying characters and graphics, a liquid crystal layer in those regions will lose its light guide effect As a result, the light linearly polarized in the direction parallel with the transmission axis of the absorption-type polarizing film 12 is transmitted as it is through the second liquid crystal cell 18. Consequently, linearly polarized light falling on the reflection-type polarizing film 14 will have the direction orthogonal to the transmission axis of the reflection-type polarizing film 14.

Accordingly, the linearly polarized light incident thereon is reflected in whole as it is by the reflection-type polarizing film 14, so that a viewer can see reflected light in a metallic tone according to the reflection characteristic of the reflection-type polarizing film 14.

Thus, with the liquid crystal display device according to this embodiment, when a voltage is applied to neither the first liquid crystal cell 16 nor to the second liquid crystal cell 18, the entire surface is displayed in a metallic tone, determined according to the reflection characteristic of the reflection-type polarizing film 14. On the other hand, when a voltage is applied to whole-surface electrodes of the first liquid crystal cell 16, display will be dependent on the reflection characteristic determined according to absorption and reflection properties of the color filter 24 and the reflector 20, so that an optical shutter for a metallic tone can be opened or closed by applying or by not applying a voltage to the first liquid crystal cell 16.

Further, by applying a voltage to the electrodes of the second liquid crystal cell 18, formed in the predetermined pattern, while applying a voltage to the whole-surface electrodes of the first liquid crystal cell 16, regions in the predetermined pattern only can be displayed in a metallic tone determined according to the reflection characteristic of the reflection-type polarizing film 14 against the color of a background, dependent on the reflection and absorption properties of the color filter 24.

Accordingly, in comparison with a conventional liquid crystal display device for displaying various information in a black color, determined according to absorption characteristics of an absorption-type polarizing film against a white background, the liquid crystal display device according to this embodiment is capable of effecting contrast by switching in the absorption and reflection characteristics among the reflection-type polarizing film 14, the color filter 24, and the reflector 20, thereby enabling the construction thereof to have variety in design so as to be able to offer users a sense of amusement If the color filter 24 and the reflector 20 are disposed on the underside of the reflection-type polarizing film 14 as described above, light transmitted through the reflection-type polarizing film 14 can be reflected repeatedly between the color filter 24 or the reflector 20, and the backside surface of the reflection-type polarizing film 14, even if the color filter 24 and the reflector 20 are of a depolarization type, resulting in improvement in a light utilization efficiency. As a result, a bright display high in contrast can be effected Further, when the liquid crystal display device according to this embodiment is applied to a timepiece, components of the light transmitted through the reflection-type polarizing film 14, at specific wavelengths, can be reflected or absorbed by combination of the color filter 24 and the reflector 20, and regions for digitally displaying time information such as the hour, minute, and second, and calendar information such as day, days of the week, month, year or a background, or regions for analog display of simulated hands for an hour hand, a minute hand, and a second hand or a background, can be colored.

Similarly to the case of the first embodiment, various other modifications to this embodiment are also possible.

Figure 10:
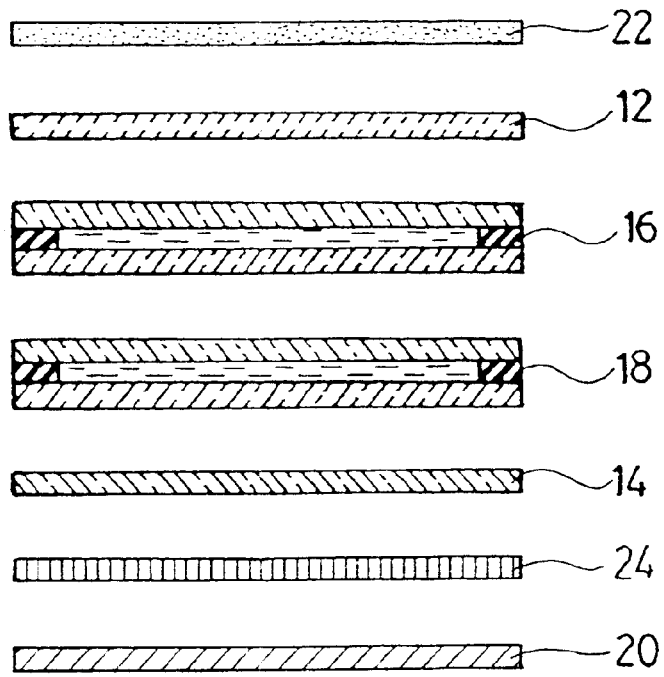

Eighth Embodiment: FIG. 10

Next, an eighth embodiment of a liquid crystal display device according to the invention is described with reference to FIG. 10.

The liquid crystal display device shown in FIG. 10 differs from the seventh embodiment of the invention, shown in FIG. 9, only in that a light scattering film 22 is installed on the visible side of the absorption-type polarizing film 12 disposed on the visible side of the first liquid crystal cell 16.

Similarly to the case of the fourth embodiment as shown in FIG. 6, the light scattering film 22 described is formed by applying silica (silicon dioxide) particles, acrylic beads, calcium powders or the like, mixed into an adhesive, to a film-like substrate.

Since the function of the liquid crystal display device according to this embodiment corresponds to a combination of that of the liquid crystal display device according to the seventh embodiment described above, equipped with the color filter 24 and the reflector 20, and that of the liquid crystal display device according to the fourth embodiment, equipped with the light scattering film 22, as shown in FIG. 6, description thereof is omitted here.

Similarly to the case of the first embodiment, various other modifications to this embodiment are also possible.

Figure 11:
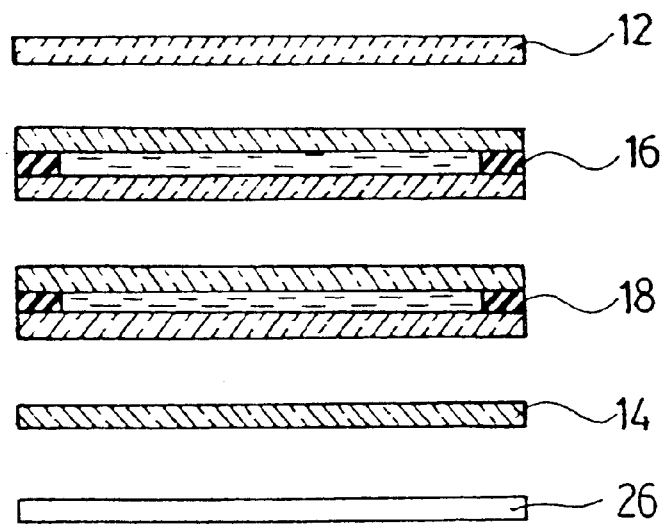

Ninth Embodiment: FIG. 11

Next, a ninth embodiment of a liquid crystal display device according to the invention is described with reference to FIG. 11.

The liquid crystal display device shown in FIG. 11 differs from the liquid crystal display device according to the first embodiment of the invention, shown in FIG. 1, only in that a backlight 26 is installed on a side opposite to the visible side (the underside in the figure) of a reflection-type polarizing film 14 disposed on a side of a second liquid crystal cell 18, opposite from the visible side.

For the backlight 26, an electroluminescent (EL) light, a light-emitting diode (LED) array, a hot cathode tube, or a cold cathode tube may be used. However, use of the EL light of a surface-emitting type is preferred.

With the liquid crystal display device provided with the backlight 26 disposed on the underside of the reflection-type polarizing film 14, if a voltage is applied to the electrodes of the second liquid crystal cell 18, formed in the predetermined pattern for displaying characters and graphics, while applying a voltage to the whole-surface electrodes of a first liquid crystal cell 16, for example, the light linearly polarized in the direction parallel with the transmission axis of the reflection-type polarizing film 14 among light emitted by the backlight 26 when lit up is transmitted through the reflection-type polarizing film 14, and falls on the second liquid crystal cell 18 in regions other than those in the predetermined pattern for displaying characters and graphics, thereby having the direction thereof rotated due to the light guide effect of the second liquid crystal cell 18.

At this point in time, the first liquid crystal cell 6 has no light guide effect, and allows the light linearly polarized falling thereon to pass as it is, turning same into the light linearly polarized in the direction parallel with the transmission axis of an absorption-type polarizing film 12, and allowing same to be transmitted through the absorption-type polarizing film 12 to travel out towards the visible side.

Further, the portion of the light emitted by the backlight 26 which is linearly polarized in the direction to the reflection axis of the reflection-type polarizing film 14 is reflected by the reflection-type polarizing film 14, however, part of the reflected light is reflected again at the surface of the backlight 26, and when depolarization occurs, the part of the reflected light becomes linearly polarized in the direction parallel with the transmission axis of the reflection-type polarizing film 14, and is transmitted through the reflection-type polarizing film 14.

Thus, with the liquid crystal display device according to this embodiment, not only a reflection-type display using external light, but also transmission-type display using backlight, both having a high light utilization efficiency, can be effected.

Since other arrangements and functions of the liquid crystal display device according to this embodiment are similar to those of the liquid crystal display device according to the first embodiment, description thereof is omitted here.

Similarly to the case of the first embodiment, various other modifications to this embodiment are also possible.

Figure 12:
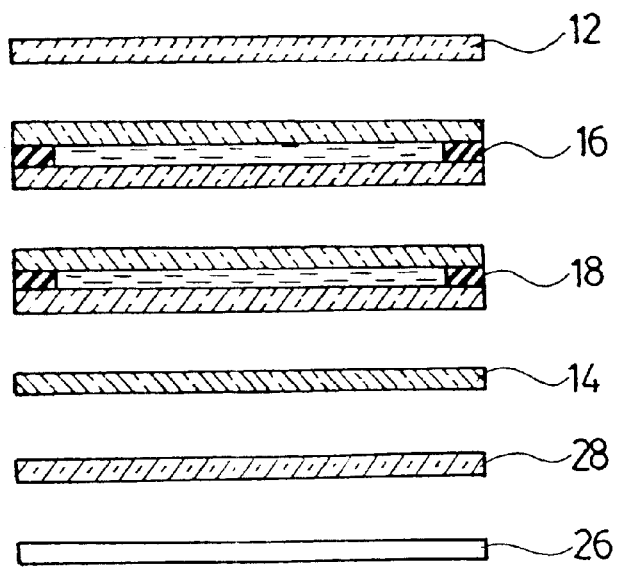

Tenth Embodiment: FIG. 12

Next, a tenth embodiment of a liquid crystal display device according to the invention is described with reference to FIG. 12.

The liquid crystal display device shown in FIG. 12 differs from the liquid crystal display device according to the ninth embodiment of the invention, shown in FIG. 11, only in that a transflective reflector 28 is installed between a reflection-type polarizing film 14, and a backlight 26 disposed on a side (the underside) of the reflection-type polarizing film 14 opposite from the visible side thereof.

The transflective reflector 28 is a member made up of a film-like substrate with a thin film of a metal such as aluminum, nickel, or the like, formed thereon so as to allow part of incoming light to pass therethrough.

With the liquid crystal display device according to this embodiment, the transflective reflector 28 is disposed on the underside of the reflection-type polarizing film 14, so that half of linearly polarized light transmitted through the reflection-type polarizing film 14 is reflected by the transflective reflector 28.

Accordingly, if a predetermined difference is set between the reflection characteristic of the reflection-type polarizing film 14 and that of the transflective reflector 28, the reflection characteristics can be alternated between by applying or by not applying a voltage to a first liquid crystal cell 16.

Accordingly, when a voltage is applied to neither the first liquid crystal cell 16 nor to the second liquid crystal cell 18, the entire surface is displayed in a metallic tone, determined according to the reflection characteristic of the reflection-type polarizing film 14. On the other hand, when a voltage is applied to whole-surface electrodes of the first liquid crystal cell 16, display will be dependent on the reflection characteristic of the transflective reflector 28, so that an optical shutter In a metallic tone can be opened or closed by applying or by not applying a voltage to the first liquid crystal cell 16.

Further, by applying a voltage to the electrodes of the second liquid crystal cell 18, formed in the predetermined pattern, while applying a voltage to the whole-surface electrodes of the first liquid crystal cell 16, regions in the predetermined pattern only can be displayed in a metallic tone determined according to the reflection characteristic of the reflection-type polarizing film 14.

Here, the absorption-type polarizing film 12 and the reflection-type polarizing film 14, disposed above and below, with the first liquid crystal cell 16 and the second liquid crystal cell 18 interposed therebetween, may be disposed such that the transmission axis of the absorption-type polarizing film 12 is parallel with that of the reflection-type polarizing film 14.

With such a configuration, contrary to the case described above, when a voltage is not applied to the first liquid crystal cell 16 and the second liquid crystal cell 18, the entire surface will be in display dependent on the reflection characteristic of the transflective reflector 28, while display in a metallic tone, dependent on the reflection characteristic of the reflection-type polarizing film 14, will be effected when a voltage is applied to the whole surface electrodes of the first liquid crystal cell 16 only.

Further, when a voltage is applied between the electrodes of the second liquid crystal cell 18, formed in a predetermined pattern for displaying characters and graphics, while keeping the first liquid crystal cell 16 in a state wherein a voltage is applied thereto, display of characters and graphics, dependent on the reflection characteristics of the transflective reflector 28, can be effected within the display in a metallic tone, determined according to the reflection characteristic of the reflection-type polarizing film 14.

Needless to say, in this case as well, the electrodes may be formed in a predetermined pattern for displaying characters and graphics inside the first liquid crystal cell 16, and the whole surface electrodes may be formed inside the second liquid crystal cell 18.

In such a case, it is to be arranged such tat the transmission axis of the absorption-type polarizing film 12 disposed on the visible side will be in parallel with the direction of the long axes of liquid crystal molecules located on the visible side of the first liquid crystal cell 16.

Similarly to the case of the first embodiment, various other modifications to this embodiment are also possible.

Figure 13:
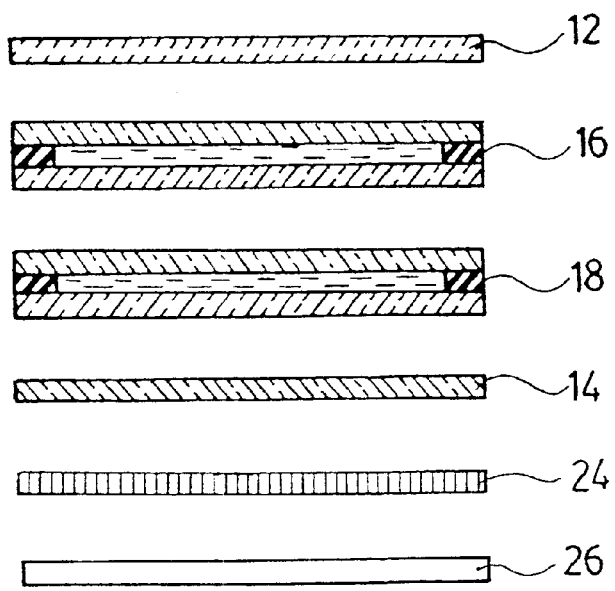

Eleventh Embodiment: FIG. 13

Next, an eleventh embodiment of a liquid crystal display device according to the invention is described with reference to FIG. 13.

The liquid crystal display device shown in FIG. 13 differs from the liquid crystal display device according to the tenth embodiment, shown in FIG. 12, only in that a color filter 24 is installed between a reflection-type polarizing film 14 in place of the transflective reflector 28, and a backlight 26 disposed on a side (the underside) of the reflection-type polarizing film 14 opposite from the visible side thereof.

For the color filter 24, a selective-transmission-type color polarizing film, a dielectric multi-layered filter, a selective-transmission-type color filter, or the like is used.

With the liquid crystal display device according to this embodiment, comprising the color filter 24 disposed on the underside of the reflection-type polarizing film 14, linearly polarized light transmitted through the reflection-type polarizing film 14 is reflected according to the reflection characteristic of the color filter 24, dependent on the optical property thereof.

In this case, if the color filter 24 of a reflection type is used, display is effected in the color of reflected light, dependent on the reflection spectrum of the color filter 24, and if the color filter 24 of an absorptive type is used, display can be effected in a muted color tone.

Accordingly, changeover between the reflection characteristic of the reflection-type polarizing film 14, and the reflection characteristic or the absorption characteristic of the color filter 24 can be executed by applying or by not applying a voltage to a first liquid crystal cell 16.

Here, as a liquid crystal layer of a second liquid crystal cell 18, in regions where a voltage is applied to electrodes of the second liquid crystal cell 18, formed in a predetermined pattern for displaying characters and graphics, will lose its light guide effect, the incoming light linearly polarized in the direction parallel with the transmission axis of an absorption-type polarizing film 12 is turned to be linearly polarized in the direction orthogonal to the transmission axis of the reflection-type polarizing film 14. Consequently, the light incident thereon is reflected in whole by the reflection-type polarizing film 14, so that a viewer can see reflected light in a metallic tone, reflected according to the reflection characteristic of the reflection-type polarizing film 14.

When a voltage is applied to neither the first liquid crystal cell 16 nor to the second liquid crystal cell 18, the entire surface is displayed in a metallic tone, dependent on the reflection characteristic of the reflection-type polarizing film 14. On the other hand, when a voltage is applied to the whole-surface electrodes of the first liquid crystal cell 16, display dependent on the reflection characteristic or the absorption characteristic of the color filter 24 will be effected, so that an optical shutter for a metallic tone can be opened or closed by applying or by not applying a voltage to the first liquid crystal cell 16.

Further, by applying a voltage to the electrodes of the second liquid crystal cell 18, formed in the predetermined pattern, while applying a voltage to the whole-surface electrodes of the first liquid crystal cell 16, only regions of the electrodes formed in the predetermined pattern can be displayed in a metallic tone, dependent on the reflection characteristic of the reflection-type polarizing film 14 against a background color determined according to the reflection characteristic and the absorption characteristic of the color filter 24.

Further, with the liquid crystal display device according to this embodiment, wherein the backlight 26 is installed on the underside of the color filter 24, the operation thereof is as follows when the backlight 26 is lit up.

For example, when a voltage is applied to the electrodes of the second liquid crystal cell 18 which are formed in the predetermined pattern for displaying characters and graphics while applying a voltage to the whole-surface electrodes of the first liquid crystal cell 16, the light linearly polarized in the direction parallel with the transmission axis of the reflection-type polarizing film 14, emitted by the backlight 26 when it is lit up and transmitted through the color filter 24, is then transmitted through the reflection-type polarizing film 14 and falls on the second liquid crystal cell 18, whereupon the polarized direction thereof rotated due to the light guide effect of the second liquid crystal cell 18 in regions other than those in the predetermined pattern for displaying characters and graphics.

At this point, the first liquid crystal cell 16 has no light guide effect, and the light linearly polarized falling thereon is allowed to pass through the absorption-type polarizing film 12 as it is.

Further, the light linearly polarized in the direction orthogonal to the transmission axis of the reflection-type polarizing film 14, among light emitted by the backlight 26 and transmitted through the color filter 24, is reflected by the reflection-type polarizing film 14, however, part of the reflected light is reflected again between the color filter 24 and the surface of the backlight 26, and when depolarization occurs, the part of the reflected light is turned to be linearly polarized in the direction parallel with the transmission axis of the reflection-type polarizing film 14, and is transmitted through the reflection-type polarizing film 14.

Thus, with the liquid crystal display device according to this embodiment, not only a reflection-type display using external light, but also a transmission-type display using a backlight, having a high light utilization efficiency, can be effected.

Since other arrangement and functions of the liquid crystal display device according to this embodiment are similar to those of the liquid crystal display device according to the tenth embodiment shown in FIG. 12, description thereof is omitted here.

Similarly to the case of the first embodiment, various other modifications to this embodiment are also possible.

Figure 14:
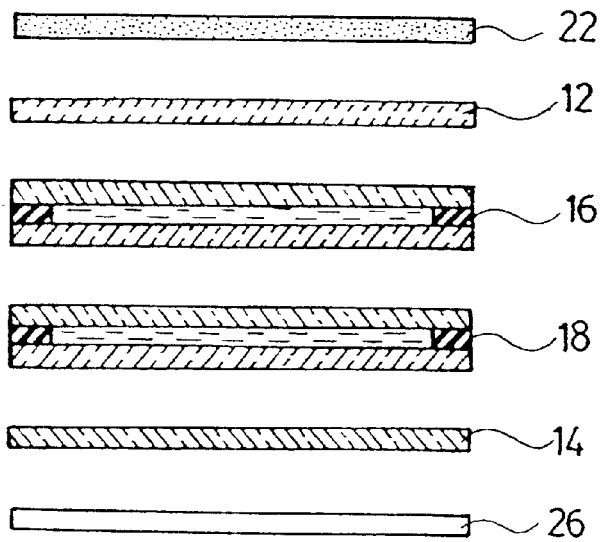

Twelfth Embodiment: FIG. 14

Next, a twelfth embodiment of a liquid crystal display device according to the invention is described with reference to FIG. 14.

The liquid crystal display device shown in FIG. 14 differs from the liquid crystal display device according to the ninth embodiment, shown in FIG. 11, only in that a light scattering film 22 is installed on the visible side of an absorption-type polarizing film 12.

The light scattering film 22 described above is formed by applying silica (silicon dioxide) particles, acrylic beads, calcium powders or the like, mixed into an adhesive, to the surface of a film-like substrate. Since the function of the light scattering film 22 is the same as in the case of the fourth embodiment shown in FIG. 6, and other functions of the liquid crystal display device according to this embodiment are the same as those for the liquid crystal display device according to the ninth embodiment shown in FIG. 11, description thereof is omitted here.

Similarly to the case of the first embodiment, various other modifications to this embodiment are also possible.

Figure 15:
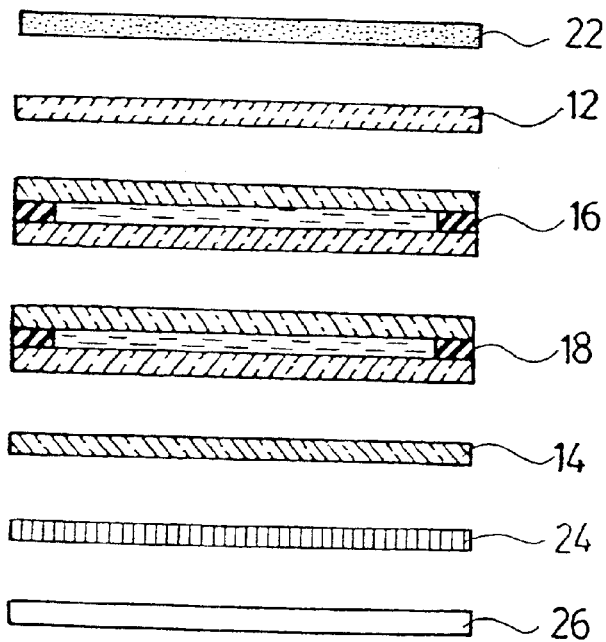

Thirteenth Embodiment: FIG. 15

Next, a thirteenth embodiment of a liquid crystal display device according to the invention is described with reference to FIG. 15.

The liquid crystal display device shown in FIG. 15 differs from the liquid crystal display device according to the twelfth embodiment, shown in FIG. 14, only in that a color filter 24 is installed between a reflection-type polarizing film 14 and a backlight 26.

Since the specific example and function of the color filter 24 are the same as those in the case of the eleventh embodiment shown in FIG. 13, description thereof is omitted here.

Similarly to the case of the first embodiment, various other modifications to this embodiment are also possible.

Figure 16:
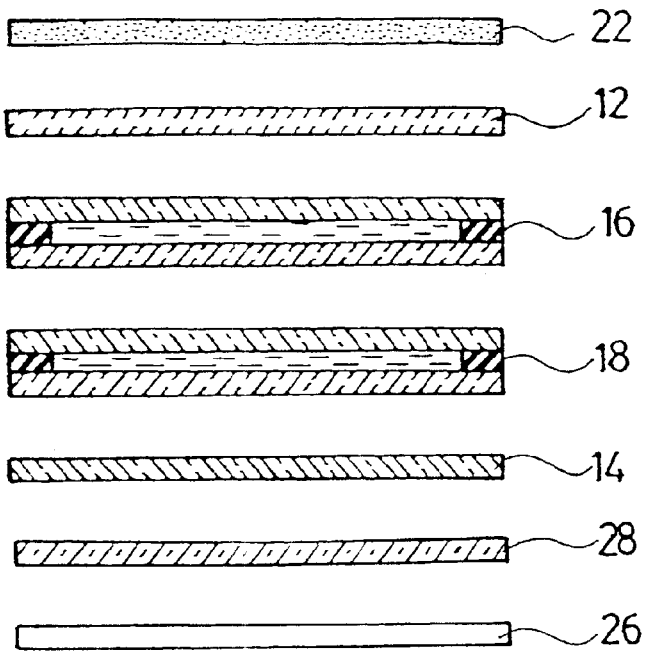

Fourteenth Embodiment: FIG. 16

Next, a fourteenth embodiment of a liquid crystal display device according to the invention is described with reference to FIG. 16.

The liquid crystal display device shown in FIG. 16 differs from the liquid crystal display device according to the twelfth embodiment, shown in FIG. 14, only in that a transflective reflector 28 is installed between a reflection-type polarizing film 14 and a backlight 26.

Since the specific example and function of the transflective reflector 28 are the same as those in the case of the tenth embodiment shown in FIG. 12, description thereof is omitted here.

Similarly to the case of the first embodiment, various other modifications to this embodiment are also possible.

Figure 17:
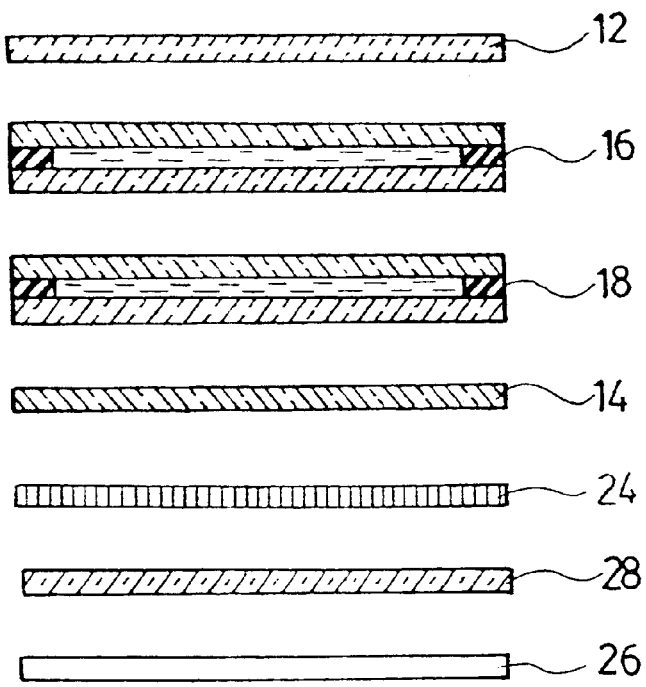

Fifteenth Embodiment: FIG. 17

Next, a fifteenth embodiment of a liquid crystal display device according to the invention is described with reference to FIG. 17.

The liquid crystal display device shown in FIG. 17 differs from the liquid crystal display device according to the eleventh embodiment, shown in FIG. 13, only in that a transflective reflector 28 is installed between a color filter 24 disposed on a side of the reflection-type polarizing film 14, opposite from the visible side thereof, and a backlight 26.

Since the function of the liquid crystal display device according to this embodiment is the same as a combination of that for the tenth embodiment shown in FIG. 12, and that for the eleventh embodiment shown in FIG. 13, description thereof is omitted here.

Similarly to the case of the first embodiment, various other modifications to this embodiment are also possible.

Figure 18:
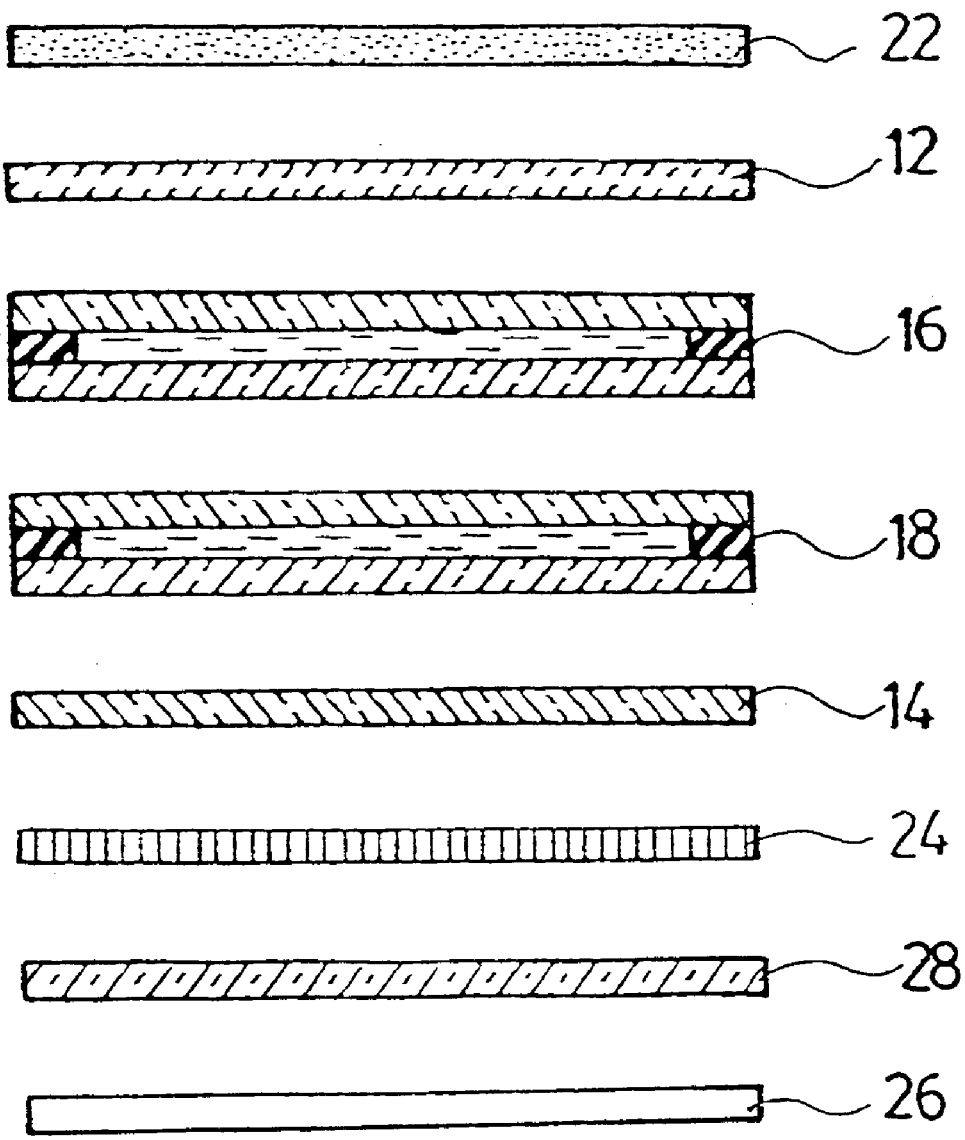

Sixteenth Embodiment FIG. 18

Lastly, a sixteenth embodiment of a liquid crystal display device according to the invention is described with reference to FIG. 18.

The liquid crystal display device shown in FIG. 18 differs from the liquid crystal display device according to the fifteenth embodiment, shown in FIG. 17, only in that a light scattering film 22 is installed on the visible side of an absorption-type polarizing film 12.

Since the specific example and function of the light scattering film 22 are the same as those in the case of the fourth embodiment shown in FIG. 6, description thereof is omitted here.

Similarly to the case of the first embodiment, various other modifications to this embodiment are also possible.

INDUSTRIAL APPLICABILITY

As described in the foregoing, with the liquid crystal display device according to the invention, information expressed in characters, graphics, and so forth can be displayed in a transparent state, in a black color, or in an optional color against a background displayed in a metallic tone. Further, by inverting display conditions between the background part and the information display segment of the device, display of characters, graphics, and so forth in a metallic tone can be effected against the background displayed in a transparent state, in a black color, or in an optional color. It is also possible to effect display of both in a metallic tone, but in a high contrast. Further, display in a softened metallic tone, or transmission-type color display carried out by lighting up a backlight, can also be effected.

Thus, the invention can provide a liquid crystal display device not only capable of effecting highly visible display in a single color, but also having variety in design and being amusing to users.

Accordingly, if the liquid crystal display device according to the invention is applied to various electronic equipment such as a timepiece and so forth, particularly to portable electronic equipment, interesting electronic equipment highly variable in design will be provided

What is claimed is:

1. A liquid crystal display device comprising:
    a first liquid crystal cell made up of a liquid crystal layer sealed in a gap between a pair of transparent substrates having an electrode formed on each of the inner surfaces thereof, facing each other;
    a second liquid crystal cell disposed on a side of the first liquid crystal cell opposite from the visible side thereof and driven independently of the first liquid crystal cell;
    an absorption-type polarizing film disposed on the visible side of the first liquid crystal cell, for absorbing the light linearly polarized in the direction orthogonal to the transmission axis thereof, and
    a reflection-type polarizing film disposed on a side of the second liquid crystal cell, opposite from the visible side thereof for reflecting the light linearly polarized in the direction orthogonal to the transmission axis thereof,
    wherein said first and second liquid crystal cells control the strength of transmitted light by applying a voltage to a liquid crystal layer without changing a color tone of the transmitted light.

2. The liquid crystal display device according to claim 1, further comprising a reflector disposed on a side of the reflection-type polarizing film, opposite from the visible side thereof.

3. The liquid crystal display device according to claim 1, further comprising a color filter disposed on a side of the reflection-type polarizing film, opposite from the visible side thereof.

4. The liquid crystal display device according to claim 3, wherein the color filter is any of a selective-transmission-type color filter, a selective-transmission-type color polarizing film, and a dielectric multi-layered filter.

5. The liquid crystal display device according to claim 1, further comprising a light scattering film disposed on the visible side of the absorption-type polarizing film.

6. The liquid crystal display device according to claim 1, further comprising a light scattering film disposed on the visible side of the absorption-type polarizing film, and a color filter on a side of the reflection-type polarizing film, opposite from the visible side thereof.

7. The liquid crystal display device according to claim 6, wherein the color filter is any of a selective-transmission-type color filter, a selective-transmission-type color polarizing film, and a dielectric multi-layered filter.

8. The liquid crystal display device according to claim 1, further comprising a light scattering film disposed on the visible side of the absorption-type polarizing film, and a reflector disposed on a side of the reflection-type polarizing film opposite from the visible side thereof.

9. The liquid crystal display device according to claim 1, further comprising a color filter disposed on a side of the reflection-type polarizing film, opposite from the visible side thereof, and a reflector disposed on a side of the color filter opposite from the visible side thereof.

10. The liquid crystal display device according to claim 9, wherein the color filter is any of a selective-transmission-type color filter, a selective-transmission-type color polarizing film, and a dielectric multi-layered filter.

11. The liquid crystal display device according to claim 9, further comprising a light scattering film disposed on the visible side of the absorption-type polarizing film.

12. The liquid crystal display device according to claim 11, wherein the color filter is either of a selective-transmission-type color filter, a selective-transmission-type color polarizing film, and a dielectric multi-layered filter.

13. The liquid crystal display device according to claim 1, further comprising a backlight disposed on a side of the reflection-type polarizing film opposite from the visible side thereof.

14. The liquid crystal display device according to claim 13, wherein the backlight is any of an electroluminescence light, a light-emitting diode array, a hot cathode tube, and a cold cathode tube.

15. The liquid crystal display device according to claim 13, further comprising a transflective reflector disposed between the reflection-type polarizing film and the backlight.

16. The liquid crystal display device according to claim 13, further comprising a color filter disposed between the reflection-type polarizing film and the backlight.

17. The liquid crystal display device according to claim 16, wherein the color filter is any of a selective-transmission-type color filter, a selective-transmission-type color polarizing film and a dielectric multi-layered filter.

18. The liquid crystal display device according to claim 16, wherein the color filter is any of a selective-transmission-type color filter, a selective-transmission-type color polarizing film, and a dielectric multi-layered filter.

19. The liquid crystal display device according to claim 16, further comprising a transflective reflector disposed between the color filter and the backlight.

20. The liquid crystal display device according to claim 1, further comprising a light scattering film disposed on the visible side of the absorption-type polarizing film, and a backlight disposed on a side of the reflection-type polarizing film opposite from the visible side thereof.

21. The liquid crystal display device according to claim 20, wherein the backlight is any of an electroluminescence light, a light-emitting diode array, a hot cathode tube, and a cold cathode tube.

22. The liquid crystal display device according to claim 20, further comprising a color filter disposed between the reflection-type polarizing film and the backlight.

23. The liquid crystal display device according to claim 22, further comprising a transflective reflector disposed between the color filter and the backlight.

24. The liquid crystal display device according to claim 1, wherein the absorption-type polarizing film and the reflection-type polarizing film are disposed such that respective transmission axes are orthogonal to or parallel with each other.

25. The liquid crystal display device according to claim 1, wherein a liquid crystal layer of the first liquid crystal cell and the second liquid crystal cell is composed of liquid crystals causing linearly polarized light passing therethrough to undergo phase modulation or intensity modulation.

26. The liquid crystal display device according to claim 25, wherein a liquid crystal layer of the first liquid crystal cell is composed of twisted nematic liquid crystals.

27. The liquid crystal display device according to claim 26, wherein the transmission axis of the absorption-type polarizing film is oriented in a direction orthogonal to or parallel with the long axes of liquid crystal molecules in the liquid crystal layer of the first liquid crystal cell on the visible side thereof.

28. The liquid crystal display device according to claim 25, wherein a liquid crystal layer of the first liquid crystal cell is composed of supertwisted nematic liquid crystals.

29. The liquid crystal display device according to claim 25, wherein a liquid crystal layer of the first liquid crystal cell is composed of guest-host liquid crystals.

30. The liquid crystal display device according to claim 29, wherein the guest-host liquid crystals are guest-host liquid crystals having homogeneous alignment in an initial alignment thereof.

31. The liquid crystal display device according to claim 30, wherein the transmission axis of the absorption-type polarizing film is oriented in a direction orthogonal to or parallel with the long axes of liquid crystal molecules in the liquid crystal layer of the first liquid crystal cell on the visible side thereof.

32. The liquid crystal display device according to claim 29, wherein the guest-host liquid crystals are guest-host liquid crystals having homeotropic alignment in an initial alignment thereof.

33. The liquid crystal display device according to claim 32, wherein the transmission axis of the absorption-type polarizing film is oriented in a direction orthogonal to or parallel with the long axes of liquid crystal molecules in the liquid crystal layer of the first liquid crystal cell on the visible side thereof, when a voltage is applied to the first liquid crystal cell.

34. The liquid crystal display device according to claim 25, wherein a liquid crystal layer of the first liquid crystal cell is composed of ferroelectric liquid crystals.

35. The liquid crystal display device according to claim 25, wherein a liquid crystal layer of the first liquid crystal cell is composed of anti-ferroelectric liquid crystals.

36. The liquid crystal display device according to claim 25, wherein a liquid crystal layer of the second liquid crystal cell is composed of twisted nematic liquid crystals.

37. The liquid crystal display device according to claim 25, wherein a liquid crystal layer of the second liquid crystal cell is composed of supertwisted nematic liquid crystals.

38. The liquid crystal display device according to claim 25, wherein a liquid crystal layer of the second liquid crystal cell is composed of guest-host liquid crystals.

39. The liquid crystal display device according to claim 38, wherein the guest-host liquid crystals are guest-host liquid crystals having homogeneous alignment in an initial alignment thereof.

40. The liquid crystal display device according to claim 38, wherein the guest-host liquid crystals are guest-host liquid crystals having homeotropic alignment in an initial alignment thereof.

41. The liquid crystal display device according to claim 25, wherein a liquid crystal layer of the second liquid crystal cell is composed of ferroelectric liquid crystals.

42. The liquid crystal display device according to claim 25, wherein a liquid crystal layer of the second liquid crystal cell is composed of anti-ferroelectric liquid crystals.

43. The liquid crystal display device according to claim 25, wherein the liquid crystal layer of the first liquid crystal cell and the second liquid crystal cell is composed of twisted nematic liquid crystals;

the transmission axis of the absorption-type polarizing film is oriented in a direction orthogonal to or parallel with the long axes of liquid crystal molecules in the liquid crystal layer of the first liquid crystal cell on the visible side thereof;

the long axes of liquid crystal molecules in the liquid crystal layer of the first liquid crystal cell, on a side thereof opposite from the visible side, are oriented in a direction parallel with or orthogonal to the long axes of liquid crystal molecules in the liquid crystal layer of the second liquid crystal cell on the visible side thereof; and the long axes of liquid crystal molecules in the liquid crystal layer of the second liquid crystal cell, on a side thereof opposite from the visible side, are oriented in a direction parallel with or orthogonal to the transmission axis of the reflection-type polarizing film.

44. The liquid crystal display device according to claim 43, wherein both the electrodes formed on the inner surfaces of a pair of transparent substrates of the first liquid crystal cell, facing each other; are whole-surface electrodes.

* * * * *